United States Patent [19]

Block

[11] Patent Number: 4,591,114

[45] Date of Patent: May 27, 1986

[54] AUTOMATIC INTERLOCK CONNECTOR ARRANGEMENT FOR RADIO-CONTROLLED MODEL AIRPLANES

[76] Inventor: Alvin Block, Box 4208, Vero Beach, Fla. 32964

[21] Appl. No.: 699,261

[22] Filed: Feb. 7, 1985

[51] Int. Cl.[4] .......... B64C 1/26

[52] U.S. Cl. .......... 244/120; 244/1 R; 244/190; 446/34

[58] Field of Search .......... 244/120, 189, 190, 1 R; 446/34, 62, 56, 66, 57, 67, 61; 339/10, 119 R, 120, 125 R, 128

[56] References Cited

U.S. PATENT DOCUMENTS 2,504,422 4/1950 Johnson et al. .......... 244/120
3,017,137 1/1962 Helmke et al. .......... 244/120
3,640,492 2/1972 Star .......... 244/120

FOREIGN PATENT DOCUMENTS 731660 6/1955 United Kingdom .......... 244/120

OTHER PUBLICATIONS

*R/C Modeler*, Oct. 1982, pp. 34–35.

*Primary Examiner*—Sherman D. Basinger
*Assistant Examiner*—Rodney Corl
*Attorney, Agent, or Firm*—Kirschstein, Kirschstein, Ottinger & Israel

[57] ABSTRACT

A fail-safe, automatic interlock connector arrangement automatically electrically interconnects an electrical component on a wing to another electrical component on a fuselage of a radio-controlled model airplane at the same time that the wing is connected to the fuselage.

13 Claims, 10 Drawing Figures

FIG. 6
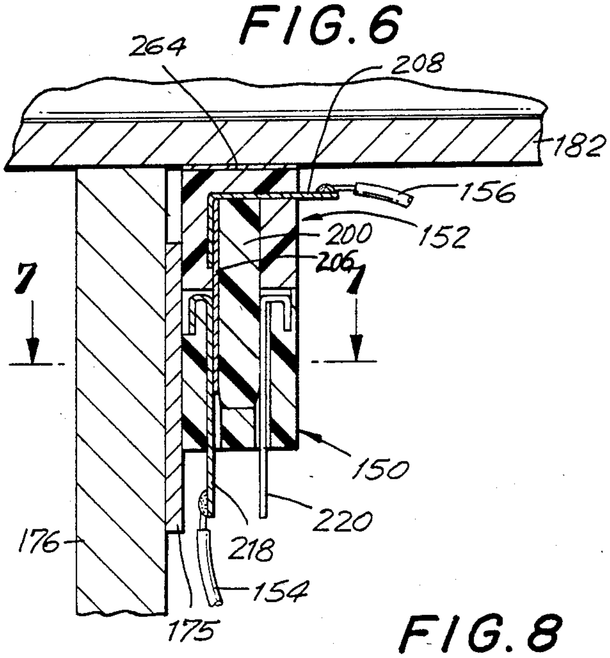
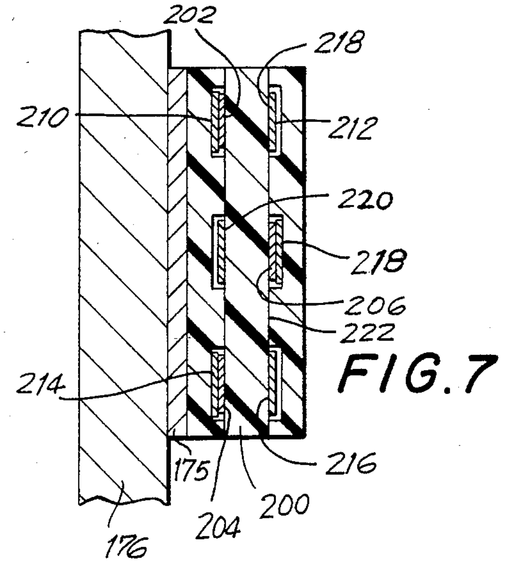
FIG. 7
FIG. 8
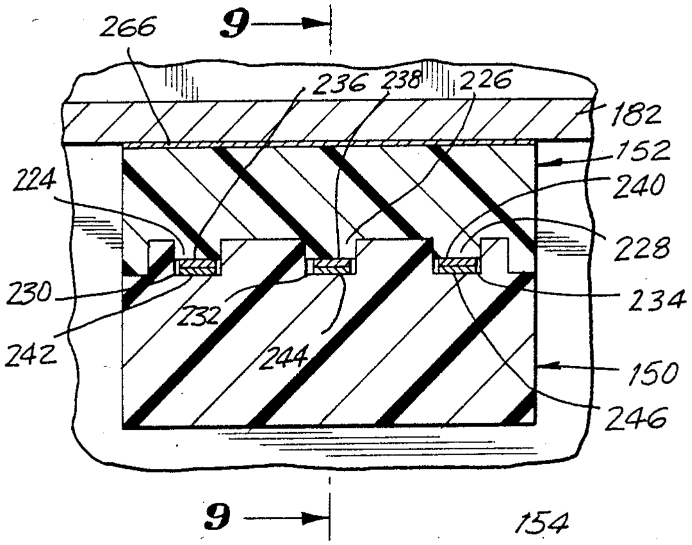
FIG. 9
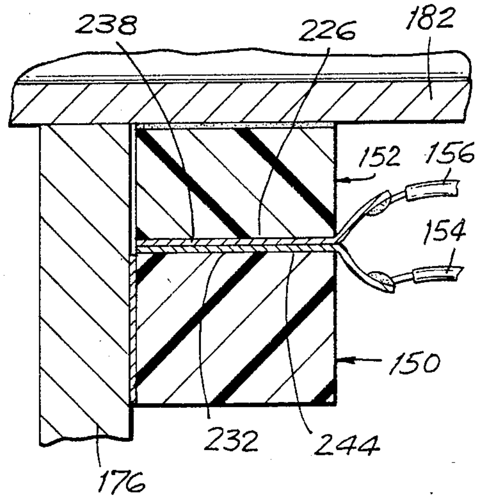
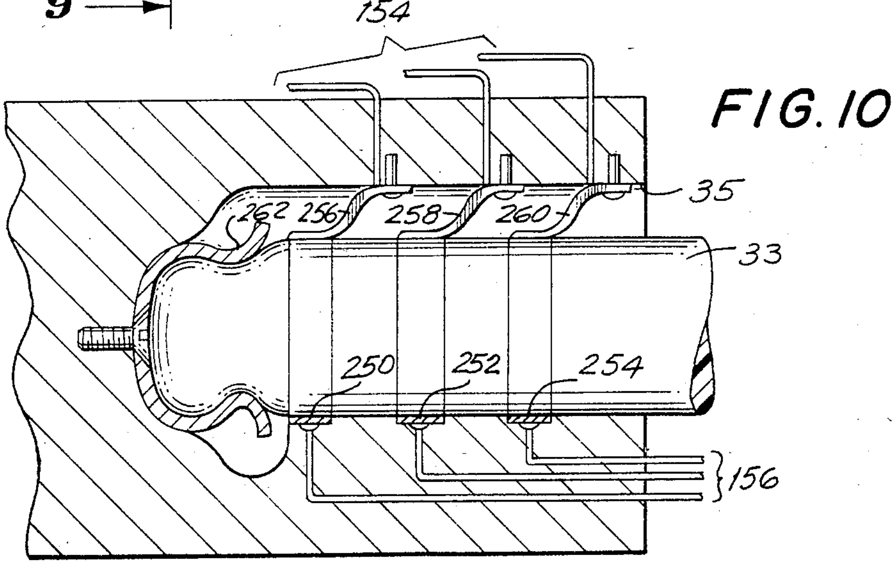
FIG. 10

AUTOMATIC INTERLOCK CONNECTOR ARRANGEMENT FOR RADIO-CONTROLLED MODEL AIRPLANES

BACKGROUND OF THE INVENTION

1. Field of the Invention

This invention generally relates to radio-controlled model airplanes of the type having a wing detachably mounted on a fuselage and, more particularly, to an automatic interlock connector arrangement having a connector stationarily mounted on the wing, and a mating connector stationarily mounted on the fuselage, the two connectors automatically electromechanically engaging each other when the wing is mounted on the fuselage.

2. Description of the Prior Art

In the art of flying a radio-controlled model airplane, it was well known for a person, hereinafter the "flyer", to operate a hand-held radio transmitter and transmit radio signals through the air to an on-board receiver which, in turn, generated control signals for controlling such airplane parts as, by way of example, the rudder, the elevator, the ailerons, the flaps, the throttle, the landing gear, etc. In order to enable the flyer readily to service, repair and clean the components mounted in the fuselage and covered by the wing, it also was known to detach the wing from the fuselage after an outing at a flying site, and to reattach the wing before the next outing at the flying site. The detaching of the wing, which in most designs had a large wingspan, also rendered the airplane more compact since the detached wing could be placed side by side with the fuselage, thereby enabling the airplane to be more conveniently transported to and from the flying site, and stored. Examples of model airplanes having detachable wings can be found, for instance, in U.S. Pat. Nos. 3,935,664; 4,233,773; 3,827,181; Re. 17,564 and 3,633,306.

Since it was customary for the flyer to attach the wing to the fuselage at the flying site before each outing, it also was necessary for the flyer to interconnect one or more electrical plugs supported by the wing, e.g. an aileron plug, which was connected by electrical wires to an aileron servo supported by the wing, to an aileron socket, which was connected by electrical wires to the receiver mounted in the fuselage cabin. The aileron servo was operatively connected to a pair of ailerons on the wing and, in response to an appropriate control signal from the receiver, the aileron servo moved the ailerons. The electrical wires between the aileron plug and the aileron servo, on the one hand, and the electrical wires between the aileron socket and the receiver, on the other hand, deliberately were made long enough so as to give the flyer sufficient length to manipulate the aileron plug with multiple freedoms of movement and to insert the aileron plug into the aileron socket during the attaching of the wing on the fuselage, as well as to remove the aileron plug from the aileron socket during the detaching of the wing from the fuselage.

Although generally satisfactory for its intended purpose, the conventional method of connecting an electrical component in the wing to the receiver in the fuselage of the radio-controlled model airplane possessed certain drawbacks. The interconnected aileron plug and aileron socket, both of which were situated at the ends of relatively long electrical wires within the cabin and thus were free to move around therein, tended undesirably and unpredictably to bounce around within the fuselage cabin during flight and, in some cases, tended to become entangled with various parts within the cabin and especially with linkages and/or pushrods which passed through the cabin to the rudder, elevator, nose gear, engine throttle, etc. The longer the aforementioned electrical wires, the more pronounced was such undesirable, unpredictable movement.

Often the flyer, due to inexperience, inadvertence or ignorance, failed to insert the aileron plug into its associated aileron socket. Also, it sometimes happened that the flyer inserted the aileron plug not into its associated aileron socket, but, instead, into another socket provided within the cabin. This other socket could have been a recharger socket, since the latter typically was not connected to anything at the flying field and thus was available within the cabin to be incorrectly mated with the aileron plug. Less likely was the possibility that the flyer could have incorrectly inserted the aileron plug into a battery socket provided within the cabin. The battery socket typically was connected to the on-board main battery at the flying site to minimize power drain. Even less likely, although theoretically possible, was the chance that the flyer could have inserted the aileron plug into a throttle socket, an elevator socket or a rudder socket, all of which were contained in the cabin within reach of the aileron plug, but each of which was supposed to be connected to respective throttle, elevator and rudder plugs provided within the cabin prior to coming to the flying field. Of course, the failure to insert the aileron plug into its aileron socket, or the insertion of the aileron plug into the wrong socket, rendered the aileron servo, if not other parts of the airplane, inoperative. Sometimes this was not discovered until the airplane was in flight, which was extremely dangerous since some of these airplanes went out of control and have been known to have killed or maimed many people, including innocent spectators. Aside from the safety hazard, this also was a frustrating experience since the airplane would have to be, if possible, landed, the wing detached, the proper connections made, and the wing reattached before the airplane again was ready for flight.

In a manner analogous to that just described for the aileron plug and socket interconnection, certain model airplanes required a plug for a retractable landing gear on the wing to be inserted into a mating landing gear socket on the fuselage. Similarly, a landing flaps plug on the wing of certain model airplanes was required to be inserted into a mating landing flaps socket on the fuselage. Still other airplane designs mounted the engine in the wing, or, in a multi-engine design, one engine was mounted in the wing and another engine was mounted in the fuselage and, in either event, a plug for the engine in the wing was required to be inserted into a mating socket on the fuselage. The more plug and socket interconnections between the wing and the fuselage, the more likely that an omission or mistake could have been made.

SUMMARY OF THE INVENTION

1. Objects of the Invention

It is a general object of this invention to overcome the aforementioned drawbacks of prior art radio-controlled model airplanes.

It is another object of this invention to automatically electromechanically interconnect a plug or a socket on the wing to a corresponding socket or a plug on the fuselage at the same time that the wing is connected to the fuselage.

It is a further object of this invention to minimize, if not eliminate, the undesirable and unpredictable bouncing around in the cabin of a plug and socket interconnection between the wing and the fuselage during flight, and the concomitant tendency of electrical wires connected to the plug and socket to become entangled with various parts and linkages passing through the cabin.

It is yet another object of this invention to eliminate the failure to interconnect, or the incorrect interconnection, of a plug or socket on the wing with a mating socket or plug on the fuselage, to prevent non-operation of one of the functions of the airplane.

It is still another object of this invention to provide a fail-safe, electromechanical interlock between an electrically-operated control component supported by the wing and a receiver supported by the fuselage.

Another object of this invention is to improve the safety of the airplane to human life and property.

Still another object of this invention is to minimize damage to the electrical circuitry in the wing and the fuselage by quickly disconnecting all plug and socket connectors therebetween in the event of a hard crash wherein the wing separates from the fuselage.

It is another object of this invention to provide such a fail-safe, electromechanical interlock which is reliable in operation, inexpensive to manufacture and durable in construction.

2. Features of the Invention

In keeping with these objects and others which will become apparent hereinafter, one feature of this invention, briefly stated, resides in an automatic interlock connector arrangement for use in a radio-controlled model airplane. The model airplane is of the type which has a fuselage and a wing detachably mounted on, and fixedly connected to, the fuselage in an intended position of use. An on-board radio receiver is supported by the fuselage and operative, in response to a radio signal transmitted through the air from a hand-held transmitter, for generating an electrical flight control signal operative for controlling various airplane functions.

A flight control component, e.g. a servo, is supported by the wing and detachably electrically connected to the receiver. The flight control component is operative, in response to the generation of the flight control signal, for controlling a flight function. For example, in a preferred embodiment, the flight control component is operative for actuating a flight control element supported by the wing when the flight control component is electrically connected to the receiver. More particularly, if the control component is an aileron servo, then the control element constitutes a pair of ailerons, each aileron being mounted on the wing for pivoting movement relative thereto. If the control component is a retractable landing gear servo, then the control element constitutes a landing gear assembly mounted on the wing for up-and-down movement relative thereto. If the control component is a landing flaps servo, then the control element constitutes a pair of flaps, each flap being mounted on the wing for pivoting movement relative thereto. The control component might also be the sole engine, or one of two engines in a multi-engine design, for propelling the airplane. In another embodiment, the control component might be a battery for powering any of the electrical components on the airplane. Other control components and elements are within the scope of this invention.

In accordance with this invention, the automatic interlock connector arrangement comprises fuselage connector means including a stationary fuselage connector which is fixedly mounted to the fuselage at a first predetermined fixed location thereon. The fuselage connector means is electrically connected to the receiver, preferably by an electrical cable connected between the receiver and the fuselage connector. The arrangement also comprises wing connector means including a stationary wing connector which is fixedly mounted to the wing at a second predetermined fixed location thereon. The wing connector means is electrically connected to the control component, preferably at an electrical cable connected between the control component and the wing connector. The stationary fuselage connector and the stationary wing connector have respective mating portions which automatically electrically and mechanically engage each other at said predetermined fixed locations at the same time that the wing is connected to the fuselage in the intended position of use.

The fixed mountings of the fuselage connector and the wing connector ensure that, when the wing is attached to the fuselage, the fuselage connector automatically will be connected to its proper wing connector. No longer can the mistake be made that the wing connector will be connected to a connector on the fuselage which is other than the correct fuselage connector, or not be connected at all. Due to the fixed, stationary mountings of the fuselage connector and the wing connector, no longer will such connectors be free to bounce around at the ends of long electrical wires within the cabin during flight, and to strike and possibly become entangled with other parts in, or linkages passing through, the cabin. The electromechanical interlock of the fuselage and wing connectors is fail-safe since it automatically occurs at the same time that the wing is attached to the fuselage, without requiring the flyer to perform a second discrete step of separately interconnecting the fuselage and wing connectors before attaching the wing.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 6 is a view analogous to FIG. 4 of another embodiment of the automatic interlock connector arrangement in accordance with this invention;

FIG. 7 is an enlarged sectional view taken on line 7—7 of FIG. 6;

FIG. 8 is a view analogous to FIG. 5 of still another embodiment of the automatic interlock connector arrangement in accordance with this invention;

FIG. 9 is an enlarged sectional view taken on line 9—9 of FIG. 8; and

FIG. 10 is an enlarged sectional view of yet another embodiment of the automatic interlock connector arrangement in accordance with this invention.

DETAILED DESCRIPTION OF THE PREFERRED EMBODIMENTS

Figure 1:
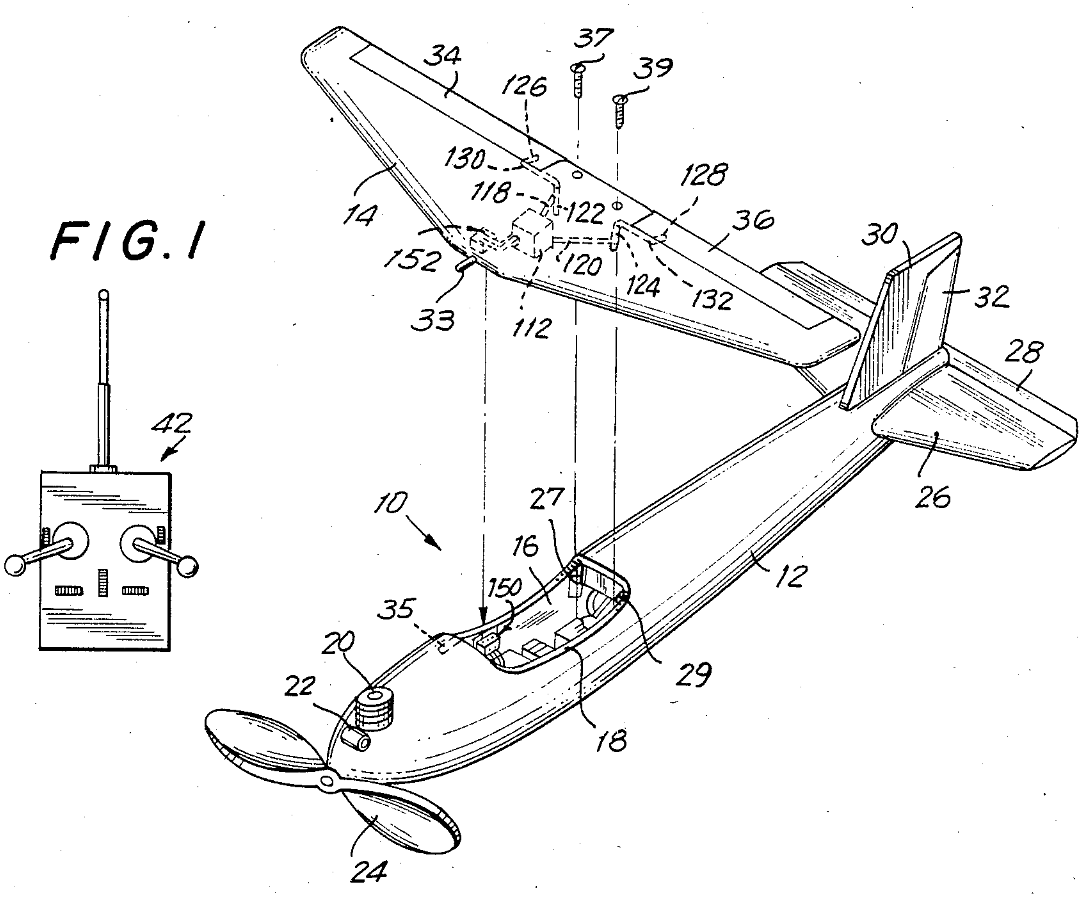
FIG. 1 is a perspective view of a radio transmitter and a radio-controlled model airplane with the wing shown prior to mounting on the fuselage, and with an automatic interlock connector arrangement in accordance with one embodiment of this invention.

Referring now to the drawings, and particularly to FIG. 1, reference numeral 10 generally identifies a radio-controlled model airplane of the type having a fuselage 12 and a wing 14 detachably mounted on, and fixedly connected to, the fuselage in an intended flying position of use. The fuselage has a cabin 16 bounding an interior space, a wing saddle 18 on which the wing 14 is mounted, an engine 20, a throttle 22, a propeller 24 driven into rotation by the engine, a stabilizer 26, an elevator 28 mounted on the stabilizer for pivoting movement relative thereto, a vertical fin 30, and a rudder 32 mounted on the vertical fin for pivoting movement relative thereto. The wing 14 has a pair of ailerons 34, 36 mounted on the wing for pivoting movement relative thereto. As shown in FIG. 1, the wing 14 has a forwardly-extending front dowel pin 33 which is inserted with slight clearance in a recess 35 formed in the fuselage. To mount the wing on the saddle 18, the pin 33 at the front of the wing is initially inserted into the recess 35, and thereupon the rear of the wing is lowered onto the saddle and is bolted to the fuselage by means of a pair of rear threaded nylon break-away bolts 37, 39, each bolt passing with slight clearance through respective openings formed through the rear of the wing and threadedly engaging respective tapped bores formed in a pair of rear support posts 27, 29 (see FIG. 2) arranged in the rear corners of the cabin.

Figure 2:
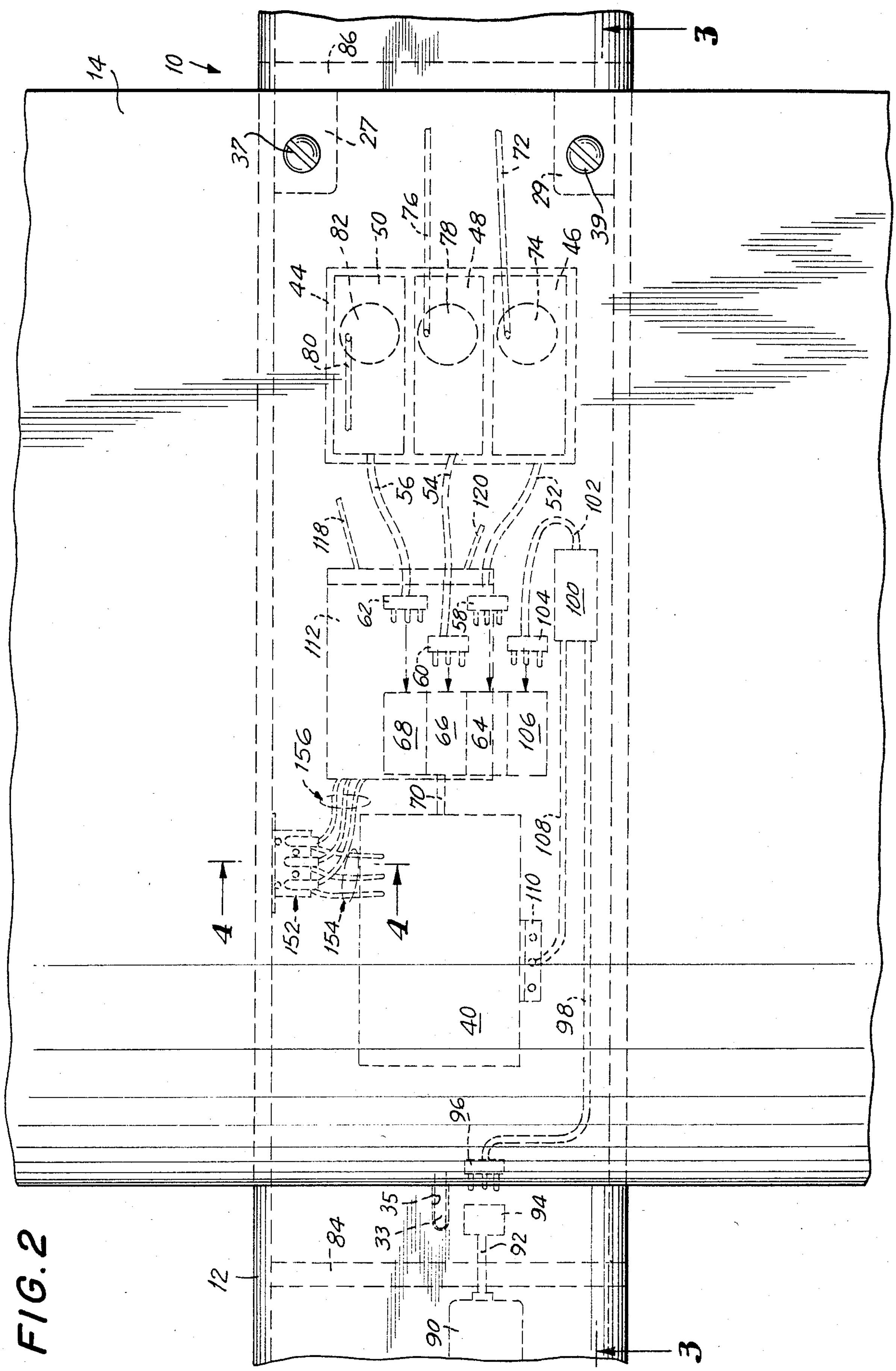
FIG. 2 is an enlarged, broken-away, top plan view of the fuselage cabin area of the airplane of FIG. 1.
Figure 3:
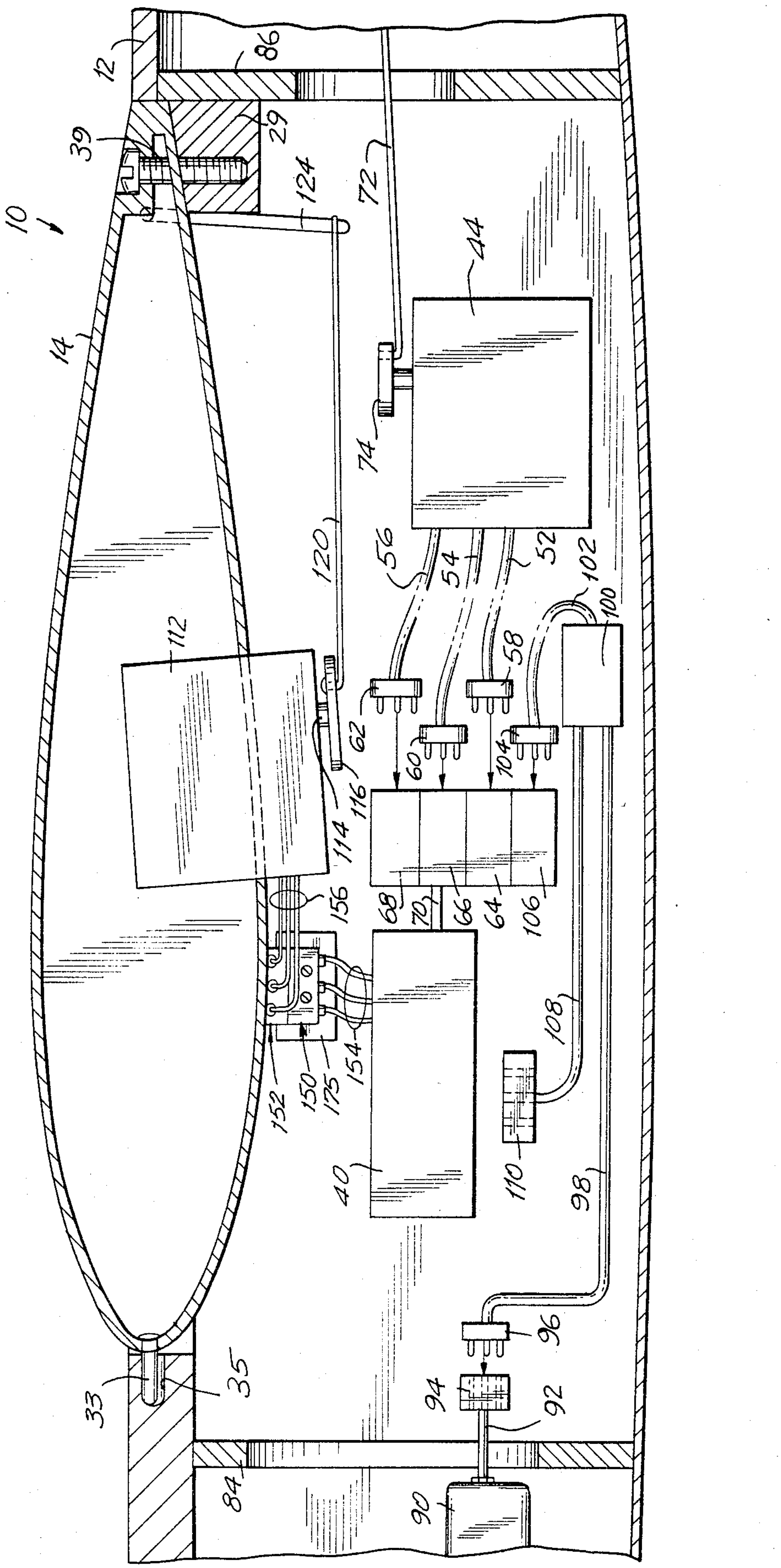
FIG. 3 is a sectional view taken on line 3—3 of FIG. 2.

As best shown in FIGS. 2 and 3, a radio receiver 40 is mounted in the cabin 16. The receiver 40 is of a conventional design and is operative, in response to radio signals transmitted through the air by a conventional radio transmitter 42 (see FIG. 1), to generate corresponding flight control signals used to control various parts and functions of the airplane. The receiver 40 is electrically connected to a bank 44 of servos also mounted in the cabin 16.

The bank 44 includes a rudder servo 46, an elevator servo 48 and a throttle servo 50. Electrical cables 52, 54, 56 are connected between servos 46, 48, 50, respectively, and rudder, elevator and throttle plugs 58, 60, 62, respectively. The rudder, elevator and throttle plugs respectively are inserted into associated rudder, elevator and throttle sockets 64, 66, 68, respectively. The rudder, elevator and throttle sockets 64, 66, 68 are connected by an electrical cable 70 to the receiver.

In operation, the receiver 40 generates appropriate rudder, elevator and throttle control signals which thereupon are conducted along cable 70; through the respective rudder plug-socket 58, 64; elevator plug-socket 60, 66; and throttle plug-socket 62, 68; through the respective rudder, elevator and throttle cables 52, 54, 56; and thereupon to the respective rudder, elevator and throttle servos 46, 48, 50. Each servo may have a rotary output shaft on which a wheel is mounted for limited angular movement in either circumferential direction about the axis along which the shaft extends. A rudder pushrod 72 has one hooked end connected to wheel 74 of the rudder servo 46, and its opposite end connected to the rudder 32 so as to pivot the latter to the right or left about a generally upright axis to steer the plane in flight. An elevator pushrod 76 has one hooked end connected to wheel 78 of the elevator servo 48, and its opposite end connected to the elevator 28 so as to pivot the latter about a generally horizontal axis to steer the plane in flight. A throttle linkage 80 has one hooked end connected to wheel 82 of the throttle servo 50, and its opposite end connected to the throttle 22 so as to actuate the latter and control the speed of the engine 20. The pushrods 72, 76 and the linkage 80 extend, at least in part, lengthwise along, and pass through, the cabin 16.

A pair of bulkheads 84, 86 are spaced longitudinally apart from each other and bound the cabin 16. Forwardly of front bulkhead 84 is a front compartment 88 in which a fuel tank as well as a rechargeable battery 90 are located. A power cable 92 passes through the front bulkhead 84 to a battery socket 94 into which a battery plug 96 is received. The battery plug 96 is, in turn, connected by a cable 98 to a manually-operated switch 100. A power output cable 102 from the switch 100 is connected to a power plug 104 which is inserted into a mating power socket 106. The power socket 106 is connected to the receiver 40 via a conductor within cable 70. Thus, when the battery plug 96 and battery socket 94 are interconnected, and when the power plug 104 and power socket 106 are interconnected, and when the switch 100 is switched to a power-on state, electrical power from the battery 90 is supplied to the receiver 40. The battery plug 96 and socket 94, as well as the power plug 104 and socket 106, typically are left interconnected at all times. Sometimes, to minimize battery drain, the plug 96 and/or the plug 104 are removed from the socket 94 and/or the socket 106.

A recharger output cable 108 also is connected to the switch 100, and a recharger socket 110 is connected at the free end of the cable 108. When a recharger is connected to the socket 110, and the switch 100 is switched to a recharge state, then the battery 90 is recharged. Since the recharging procedure typically is not done at the flying site, the recharger socket 110 typically is not connected to any plug at the flying site, and is left unconnected in the cabin 16.

Briefly summarizing the discussion so far, the receiver 40, powered by the battery 90, is operative to separately control the throttle 22, the elevator 28 and the rudder 32 by conducting respective flight control signals to the corresponding servo mounted on the fuselage. The receiver 40 also is operative to control servos not mounted on the fuselage, but, instead, which are mounted on the wing 14.

For example, as best shown in FIGS. 2 and 3, an aileron servo 112 is mounted on the wing 14. In response to an appropriate flight control signal from the receiver 40, the aileron servo 112 is operative to turn a wheel mounted on an output shaft for limited angular movement in either circumferential direction about the axis along which the shaft extends. Thus, aileron servo 112 has an output shaft 114 on which a wheel 116 is mounted. A pair of aileron linkages 118, 120 each have one hooked end connected to the wheel 116 at opposite sides of the turning axis. Each other end of the aileron linkages 118, 120 respectively is connected to lower arms 122, 124 of aileron horns 130, 132. Each horn 130, 132 has additional arms 126, 128 fixed in, and connected to, the ailerons 34, 36. The aileron servo 112 is operative to turn the wheel 116 in either circumferential direction so that the aileron linkage 118 is pulled forwardly at the same time that the aileron linkage 120 is pushed rearwardly, and vice versa. Thus, the ailerons 34, 36 are pivoted apart from each other in opposite circumferential directions to effect a steering turn (bank) either to the right or to the left during flight.

As described so far, the structure and function of the above parts of the model airplane are entirely conventional and, hence, a more detailed description is not believed to be necessary.

In accordance with this invention, an automatic interlock connector arrangement is provided on the model airplane and comprises a fuselage connector means including a fuselage connector 150 fixedly and stationarily mounted on the fuselage 12, and a wing connector 152 fixedly and stationarily mounted on the wing 14. The fuselage connector 150 is electrically connected by an electrical cable 154 to the receiver 40; the wing connector 152 is electrically connected by an electrical cable 156 to the aileron servo 112. When the wing 14 is mounted on the wing saddle 18, the fuselage connector 150 and the wing connector 152, both of which are located at predetermined fixed locations that preferably are juxtaposed vertically with each other, automatically electromechanically engage each other.

Figure 4:
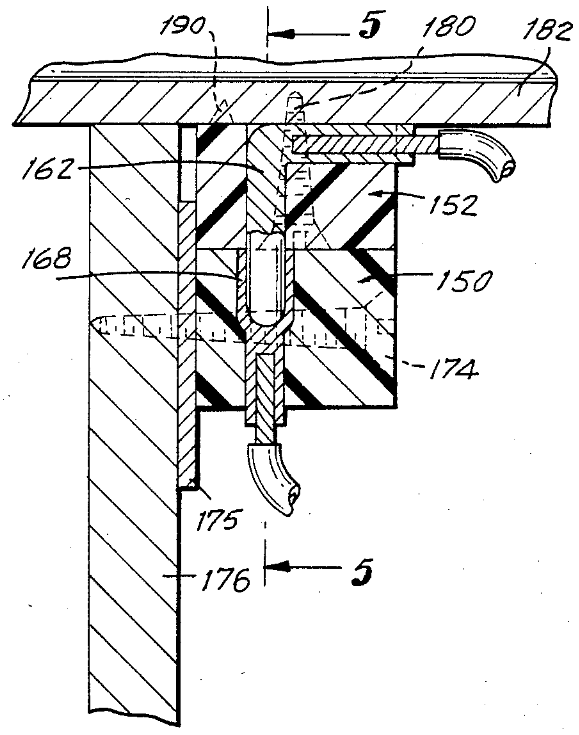
FIG. 4 is an enlarged sectional view taken on line 4—4 of FIG. 3.
Figure 5:
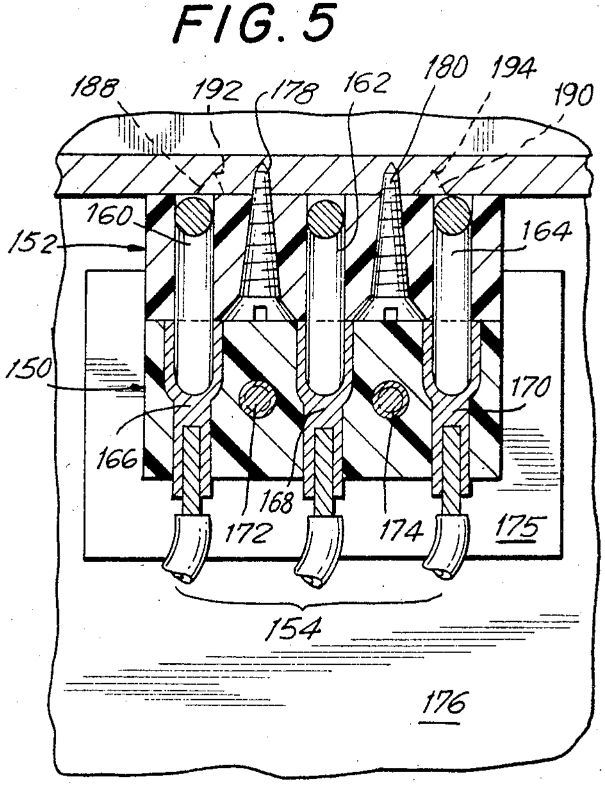
FIG. 5 is a sectional view taken on line 5—5 of FIG. 4.

In a preferred embodiment, the wing connector 152 constitutes an electrical plug, and the fuselage connector 150 constitutes an electrical socket, although the reverse placement of the socket and plug also is within the spirit of this invention. Also preferred is a three-wire system wherein the cable 154 and the cable 156 each comprise three electrical conductors, although it readily will be understood that wire systems comprised of a different number of conductors also are within the scope of this invention. In a first embodiment, as best shown in FIGS. 4 and 5, the wing plug 152 comprises three cylindrical pins 160, 162, 164, each of which projects downwardly; and the fuselage socket 150 comprises three upwardly-open cylindrical outlets 166, 168, 170 which respectively snugly receive the pins 160, 162, 164 in sliding electromechanical contact upon insertion of the pins into the outlets. The three conductors of the cable 154 respectively are connected to the outlets 166, 168, 170; and the three conductors of the cable 156 respectively are connected to the pins 160, 162, 164.

A pair of countersunk mounting screws 172, 174, or any other anchoring means, e.g. an adhesive, anchor the fuselage socket 150 to a vertical wooden back plate 175 and to a vertical side wall 176 of the cabin 16. Another pair of countersunk mounting screws 178, 180, or any other anchoring means, e.g. an adhesive, anchor the wing plug 152 to the underside or bottom wall 182 of the wing 14. Preferably, the fuselage socket 150 is in vertical alignment with the wing plug 152 when the wing 14 is mounted on the saddle 18.

In use, every time the flyer attaches the wing 14 to the saddle 18, the wing plug 152 is automatically inserted into the fuselage socket 150. When the wing plug 152 is connected to the aileron servo 112, and when the fuselage socket 150 is connected to the aileron output of the receiver 40, this ensures that the aileron plug 152 always will be inserted into the aileron socket 150. No longer can the mistake be made that the aileron plug 152 either will not be connected at all, or will be inserted into an incorrect socket, such as the recharger socket 110, or the battery socket 94, or the throttle socket 68, or the elevator socket 66, or the rudder socket 64, or the power socket 106, all of which are located within the cabin 16 within reach of the aileron plug 152.

When the wing plug 152 is connected to a retractable landing gear servo, or to a landing flaps servo, both of which are supported by the wing 14, then, in a completely analogous manner to that just described for the aileron servo 112, the corresponding landing gear plug, and/or the landing flaps plug, both of which are supported by the wing 14, on the one hand, always will be inserted into the mating landing gear socket, and/or the landing flaps socket, both of which are supported by the fuselage 12, on the other hand. One or more wing plugs can be provided on the wing and be inserted into a corresponding one or more fuselage sockets provided on the fuselage.

Due to the stationary mounting of the wing plug and the fuselage socket, the wing plug and fuselage socket no longer will bounce around in the cabin 16 during flight. The cables 154, 156 no longer will become entangled with the various parts in, or linkages or pushrods which pass through, the cabin. The cables 154, 156 are much shorter than in the prior art because no longer does the necessity exist that the cables must be sufficiently long to enable the flyer readily to manipulate with multiple freedoms of movement the wing plug into the fuselage socket.

A pair of locating pins 188, 190 are provided on one of the connectors, e.g. the wing plug 152, in order correctly to position the wing plug on the wing so that when the latter is bolted on the saddle, the wing plug electromechanically will engage the fuselage socket. For this purpose, the locating pins 188, 190 each are provided with a pointed end 192, 194 facing the bottom wall 182 of the wing. Prior to anchoring the wing plug in position on the bottom wall 182, the fuselage socket 150 first is anchored in its position on the side wall 176 of the cabin and, thereupon, the pins 160, 162, 64 of the wing plug 152 are inserted into the corresponding outlets 166, 168, 170 of the fuselage socket 150. The upwardly-facing pointed ends 192, 194, at least partially, will enter and bite into the facing bottom wall 182 of the wing when the latter is bolted on the saddle 18, the pointed ends thereby marking the position that the wing plug should be anchored on the wing. Thereupon, the wing is removed from the saddle, and the wing plug removed from the fuselage socket. The wing plug now is located on the bottom wall by placing the pointed ends 192, 194 again to overlie the previously marked positions on the bottom wall and, once so located, the wire plug then is anchored in place using the anchoring screws 178, 180, or an analogous anchoring means. The above-described marking and assembly procedure is of particular benefit to hobbyists who wish to retrofit their model airplanes with the automatic interlock connector arrangement of this invention.

The wing plug 152 and the fuselage socket 150 of the interlock arrangement need not be comprised of a plurality of cylindrical pins, each insertable into respective cylindrical outlets.

Turning now to the embodiment of FIGS. 6 and 7, the wing plug 152 may include a printed circuitboard or plate 200 having a plurality of electrically conductive strips 202, 204, 206 applied thereon. As best shown in FIG. 7, the conductive strips 202, 204 are located at one planar surface of the plate, and the conductive strip 206 is located at the opposite planar surface, thereby achieving good separation between the three strips. The strips extend in mutual parallelism along the vertical direction, and are spaced apart from each other along the width of the plate. A plurality of terminals, e.g. see representative terminal 208, each has one end embedded in the wing plug and making electrical contact with an upper end of a respective strip, and an opposite end extending out of the wing plug and soldered to an exposed end of a respective wire of the cable 156.

The fuselage socket 150 has three pairs of opposed contacts 210, 212 and 214, 216 and 218, 220 arranged along a longitudinal channel 222. Each opposed contact pair slidably receives between its contacts in surface engagement therewith a respective strip 202, 204, 206 when the plate 200 is inserted into the channel 222. Each contact has one end embedded in the fuselage socket, and an opposite end extending out of the fuselage socket. One of the contacts of each pair is soldered to an exposed end of a respective wire of the cable 154.

The embodiment of FIGS. 6 and 7 is currently preferred over that of FIGS. 4 and 5 because the alignment of the mating portions of the wing plug and the fuselage socket is not as critical. In the embodiment of FIGS. 4 and 5, each cylindrical pin must be received with slight clearance in a respective cylindrical outlet, and there is not as much alignment leeway as in the embodiment of FIGS. 6 and 7 wherein the longitudinally elongated plate 200 is received in the elongated channel 222, and slightly offset registrations between the strips 202, 204 and 206 and the respective contact pairs are tolerated.

Still another embodiment of the interlock connector arrangement is shown in FIGS. 8 and 9, wherein the lower surface of the wing plug 152 has elongated ridges 224, 226, 228, each having a rectangular cross-section, and each receivable in respective rectangular notches 230, 232, 234. Conductive strips 236, 238, 240 are fixedly mounted on, and extend along, each ridge. Resilient elongated fingers 242, 244, 246 are resiliently mounted in, and extend along, each notch. When the plug 152 is inserted into the socket 150, each strip on the ridges makes electromechanical contact with a respective finger in the notches. The strips are connected, for example, by soldering to respective exposed ends of the cable 156; and the fingers are also connected, for example, by soldering to respective exposed ends of the cable 154.

Rather than mounting the wing plug 152 on the bottom wall 182 of the wing, and the fuselage socket 150 on the vertical side wall 176 of the cabin of the fuselage, other mounting assemblies are also within the spirit of this invention. As shown in FIG. 10, the aforementioned front dowel pin 33 on the wing may support the wing plug which, in this case, comprises three spaced-apart electrically conducting rings 250, 252, 254, each electrically connected to a respective wire of the cable 156. The fuselage socket, in this case, comprises three resilient fingers 256, 258, 260, each having one end electrically connected to a respective wire of the cable 154, and an opposite end engageable with a respective ring when the pin 33 is fully inserted into its recess 35. The leading end of the pin 33 may be undercut to snappingly be engaged by a spring clip 262 which is anchored in the closed end of the recess 35. Upon full insertion of the pin 33 into the recess 35, the cable 154 is connected to the cable 156 automatically with the mounting of the wing. Rather than modifying the front dowel pin 33, another pin can be provided on the wing and modified as described above.

It will be understood that each of the elements described above, or two or more together, also may find a useful application in other types of constructions differing from the types described above.

For example, the fuselage socket 150 need not be mounted on the vertical side wall 176 of the cabin, but can be equally well located anywhere on the fuselage. The wing 14 may be connected to the fuselage in other ways, such as by the use of a pair of spaced-apart wing dowels which transversely extend through the cabin, and by retaining the wing in place using rubberbands or the like entrained about the dowels. Rather than bolting the wing plug and/or fuselage socket to their respective support surfaces, the wire plug and/or fuselage socket may be permanently mounted to their respective support surfaces by means of an adhesive (see reference numerals 264, 266) such as epoxy resin glue, or silicone, or a double-sided tape.

In its broadest aspect, this invention relates to making an electrical connection between an electrical component supported by the wing and another electrical component supported by the fuselage. The electrical component may be an aileron servo, a retractable landing gear servo, a flaps servo, an engine, a battery, or, for that matter, any electrical component whose operation affects the performance of the airplane. The electrical connection may be made automatically in a one-step procedure wherein the electrical connection is made at the same time that the wing is mounted to the fuselage, or in a two-step procedure wherein the wing is first mounted to the fuselage and then a separate manual motion is required to make the electrical connection. For example, a slide switch may be manually operated to make the electrical connection between the electrical component supported by the wing and the other electrical component supported by the fuselage after the wing has been mounted to the fuselage. In either the one-step or the two-step procedure, the fuselage connector is stationarily mounted to the fuselage, and the wing connector is stationarily mounted to the wing.

While the invention has been illustrated and described as embodied in an automatic interlock connector arrangement for radio-controlled model airplanes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a radio-controlled model of the type having (A) a first model part;

(B) a second model part routinely detachable by a radio control enthusiast after each model use from the first model part and routinely attached by the enthusiast before the next model use to the first model part in an intended position of use;

(C) a receiver supported by the first model part and operative, in response to a radio signal from a transmitter, for generating an electrical control signal; and (D) a control component supported by the second model part and routinely disconnectable after each model use from the receiver and routinely electrically connected before the next model use to the receiver, said control component being operative, in response to the generation of the control signal, for controlling a model function each time when the control component is electrically connected to the receiver;

an automatic interlock connector arrangement for affirmatively making an electromechanical connection during the detachment between the receiver and the control component without having the enthusiast perform the electrical connection of the control component as a separate step, comprising:

(a) a first connector means electrically connected to the receiver and including a first stationary connector fixedly mounted to, and located at a first predetermined fixed location on, the first model part;

(b) second connector means electrically connected to the control component and including a second stationary connector fixedly mounted to, and located at a second predetermined fixed location on, the second model part; and (c) said first stationary connector and said second stationary connector having respective mating portions which automatically electrically engage each other at said predetermined locations at the same time and each time that the second model part is attached to the first model part in the intended position of use, thereby ensuring that the electrical connection of the control component will be made and that the model function will be controlled.

2. In a radio-controlled model airplane of the type having (A) a fuselage;

(B) a wing routinely detachable by a radio control enthusiast after each flight from the fuselage and routinely attached by the enthusiast before the next flight to the fuselage in an intended position of use;

(C) a receiver supported by the fuselage and operative, in response to a radio signal from a transmitter, for generating an electrical flight control signal; and (D) a flight control component supported by the wing and routinely disconnectable after each flight from the receiver and routinely electrically connected before the nest flight to the receiver, said flight control component being operative, in response to the generation of the flight control signal, for controlling a flight function each time when the flight control component is electrically connected to the receiver;

an automatic interlock connector arrangement for affirmatively making an electromechanical connection during the wing attachment between the fuselage-supported receiver and the wing-supported flight control component without having the enthusiast perform the electrical connection of the flight control component as a separate step, comprising:

(a) fuselage connector means electrically connected to the receiver and including a stationary fuselage connector fixedly mounted to, and located at a first predetermined fixed location on, the fuselage;

(b) wing connector means electrically connected to the flight control component and including a stationary wing connector fixedly mounted to, and located at a second predetermined fixed location on, the wing; and (c) said stationary fuselage connector and said stationary wing connector having respective mating portions which automatically electrically engage each other at said predetermined locations at the same time and each time that the wing is attached to the fuselage in the intended position of use, thereby ensuring that the electrical connection of the flight control component will be made and that the flight function will be controlled.

3. The automatic interlock connector arrangement as recited in claim 2, wherein the mating portion of the wing connector constitutes at least one male-type projecting prong, and wherein the mating portion of the fuselage connector constitutes at least one female-type socket for snugly receiving the prong.

4. The automatic interlock connector arrangement as recited in claim 2, wherein the mating portion of the wing connector constitutes at least one electrically conductive strip, and wherein the mating portion of the fuselage connector constitutes at least one electrical contact for engaging the strip.

5. The automatic interlock connector arrangement as recited in claim 4, wherein the strip is supported on an elongated plate, and wherein the electrical contact is situated in an elongated channel in which the plate is inserted.

6. The automatic interlock connector arrangement as recited in claim 2, wherein the wing connector comprises at least one ridge on which an electrically conductive strip is mounted, and wherein the fuselage connector comprises at least one notch in which the strip is insertable and in which an electrically conductive finger is resiliently mounted for resiliently electrically contacting the strip upon such insertion.

7. The automatic interlock connector arrangement as recited in claim 2, wherein the wing connector comprises at least one electrically conductive ring mounted on a wing pin which is insertable in a recess formed in the fuselage, and wherein the fuselage connector comprises at least one electrically conductive finger within the recess for resiliently electrically contacting the ring upon insertion of the pin into the recess to attach the wing to the fuselage and to simultaneously electrically interconnect the wing and fuselage connectors.

8. The automatic interlock connector arrangement as recited in claim 2, wherein the fuselage connector means includes at least one electrical wire connected between the fuselage connector and the receiver, and wherein the wing connector means includes at least one electrical wire connected between the wing connector and the flight control component.

9. The automatic interlock connector arrangement as recited in claim 2; and further comprising locating means on one of the connectors for locating the same at the predetermined location of the same, said locating means including a pair of locating pins each having pointed ends spaced apart from each other, said pointed ends being operative, at least partially, to penetrate a support surface on which said one connector is supported.

10. The automatic interlock connector arrangement as recited in claim 2, wherein the fuselage connector and the wing connector are stationarily mounted on the fuselage and the wing, respectively, by an adhesive.

11. The automatic interlock connector arrangement as recited in claim 2, wherein the flight control component actuates a flight control element mounted on the wing for movement relative thereto.

12. The automatic interlock connector arrangement as recited in claim 11, wherein the flight control element comprises a pair of ailerons pivotably mounted on the wing, and wherein the flight control component includes an aileron servo operatively connected to the ailerons for pivoting the same.

13. In a radio-controlled model airplane of the type having:

(A) a fuselage;

(B) a wing routinely detachable by a radio control enthusiast after each flight from the fuselage and routinely attached by the enthusiast before the next flight to the fuselage in an intended position of use;

(C) a receiver mounted to the fuselage and operative, in response to a radio signal from a transmitter, for generating an electrical flight control signal; and (D) a flight control servo mounted to the wing and routinely disconnectable after each flight from the receiver and routinely electrically connected before the next flight to the receiver, said flight control servo being operative, in response to the generation of the flight control signal, for controlling a flight function each time when the flight control servo is electrically connected to the receiver;

an automatic interlock connector arrangement for affirmatively making an electromechanical connection during the wing attachment between the fuselage-supported receiver and the wing-supported flight control servo without having the enthusiast perform the electrical connection of the flight control servo as a separate step, comprising:

(a) a fuselage connector means including a stationary fuselage connector fixedly mounted to, and located at a first predetermined fixed location on, the fuselage, said fuselage connector being electrically connected to the receiver;

(b) wing connector means including a stationary wing connector fixedly mounted on, and located at a second predetermined fixed location on, the wing, said second location being vertically juxtaposed with said first predetermined location each time when the wing is attached to the fuselage in the intended position of use, said wing connector being electrically connected to the flight control servo; and (c) said stationary fuselage connector and said stationary wing connector having respective mating portions which automatically electrically engage each other at said vertically juxtaposed predetermined locations each time when the wing is attached to the fuselage in the intended position of use, thereby ensuring that the electrical connection of the flight control servo will be made and that the flight function will be controlled.

* * * * *